(12) United States Patent
Stoner et al.

(10) Patent No.: US 7,968,789 B2
(45) Date of Patent: Jun. 28, 2011

(54) METHOD AND APPARATUS FOR EYE-SAFE TRANSMITTAL OF ELECTRICAL POWER IN VEHICLES USING WHITE LIGHT VIA PLASTIC OPTICAL FIBER

(75) Inventors: Paul Stoner, Powell, OH (US); Wilbur C. Vogley, Cranberry Township, PA (US)

(73) Assignee: International Optical Interface, Inc., Wexford, PA (US)

( * ) Notice: Subject to any disclaimer, the term of this patent is extended or adjusted under 35 U.S.C. 154(b) by 1152 days.

(21) Appl. No.: 11/647,652

(22) Filed: Dec. 28, 2006

(65) Prior Publication Data
US 2008/0271777 A1    Nov. 6, 2008

Related U.S. Application Data

(60) Provisional application No. 60/755,426, filed on Dec. 30, 2005, provisional application No. 60/831,999, filed on Jul. 19, 2006.

(51) Int. Cl.
*H01L 31/00*    (2006.01)
(52) U.S. Cl. ................................ 136/246; 136/244
(58) Field of Classification Search .................. 136/244, 136/246
See application file for complete search history.

(56) References Cited

U.S. PATENT DOCUMENTS

| | | | |
|---|---|---|---|
| 3,935,526 A * | 1/1976 | Kamata et al. | 363/21.04 |
| 4,443,853 A * | 4/1984 | Maciolek et al. | 701/3 |
| 4,865,417 A | 9/1989 | Naohiro et al. | |
| 5,040,168 A | 8/1991 | Maue et al. | |
| 5,222,166 A | 6/1993 | Weltha | |
| 5,592,391 A | 1/1997 | Muyshondt et al. | |
| 6,057,786 A | 5/2000 | Briffe et al. | |

(Continued)

FOREIGN PATENT DOCUMENTS
JP    55-006925    *    1/1980

OTHER PUBLICATIONS

Website, "Poly-Optical Fiber Optic Specification page"; http://www.poly-optical.com/specifications.html from Jul. 14, 2002, available from www.archive.org. 10 pages.*

*Primary Examiner* — Jeffrey T Barton
(74) *Attorney, Agent, or Firm* — Ansel M. Schwartz

(57) ABSTRACT

An apparatus for transmitting wide spectrum white light having a plurality of plastic optical fibers. The apparatus includes a sheath housing the plurality of fibers. An apparatus for providing energy in an airplane. The apparatus includes a light source which produces wide spectrum white light. The apparatus includes a cable through which the eye-safe and fire-safe light from the light source is transmitted. The apparatus includes an avionics box to which the cable is connected that is powered by the light transmitted by the cable. An apparatus for providing energy in an airplane. The apparatus includes means for producing energy that is eye-safe and fire safe. The apparatus includes an avionics box to which the producing means is connected that is powered by the energy form the producing means. A method for providing energy in an airplane. The method includes the steps of producing wide spectrum white light from a light source. There is the step of transmitting the eye-safe and fire-safe light from the light source through a cable. There is the step of powering an avionics box to which the cable is connected by the light transported by the cable.

14 Claims, 13 Drawing Sheets

U.S. PATENT DOCUMENTS

| | | |
|---|---|---|
| 6,402,347 B1 * | 6/2002 | Maas et al. .................... 362/294 |
| 6,643,465 B1 | 11/2003 | Bosinger et al. |
| 6,704,515 B1 | 3/2004 | Chan et al. |
| 6,851,649 B1 | 2/2005 | Radford |
| 7,463,832 B2 | 12/2008 | Weaver |
| 2001/0026216 A1 | 10/2001 | Block |
| 2003/0072053 A1 | 4/2003 | Weaver et al. |
| 2006/0062573 A1 | 3/2006 | Uchida et al. |
| 2006/0067697 A1 | 3/2006 | Aizpuru |

* cited by examiner

METHOD AND APPARATUS FOR EYE-SAFE TRANSMITTAL OF ELECTRICAL POWER IN VEHICLES USING WHITE LIGHT VIA PLASTIC OPTICAL FIBER

This application claims the benefit of U.S. Provisional Applications No. 60/755,426, filed on Dec. 30, 2005 and 60/831,999, filed on Jul. 19, 2006.

FIELD OF THE INVENTION

The present invention relates to the transmission of light that is eye-safe and fire-safe. More specifically, the present invention relates to the transmission of light that is eye-safe and fire-safe to an avionics box in an airplane.

BACKGROUND OF THE INVENTION

Prior art exists to transmit electrical power via light (photons) instead of using wires (electrons). These systems use single frequency lasers as a light source. For the transmission media prior art uses Glass Optical Fiber. For reception of the light, and conversion back to electricity they use high cost, specialized Semiconductor Photonic Converter devices. These systems are limited in the amount of power that can be transmitted (typically 0.1 to 1 watt). These systems are not inherently eye-safe for people working close to the equipment. Reference Photonic Power Systems, Inc.

BRIEF SUMMARY OF THE INVENTION

The present invention relates to an apparatus for transmitting wide spectrum white light. The apparatus comprises a plurality of plastic optical fibers. The apparatus comprises a sheath housing the plurality of fibers.

The present invention relates to an apparatus for providing energy in an airplane. The apparatus comprises a light source which produces wide spectrum white light. The apparatus comprises an eye-safe and fire-safe cable through which the light from the light source is transmitted. The apparatus comprises an avionics box to which the cable is connected that is powered by the light transmitted by the cable.

The present invention relates to an apparatus for providing energy in an airplane. The apparatus comprises means for producing energy that is eye-safe and fire safe. The apparatus comprises an avionics box to which the producing means is connected that is powered by the energy from the producing means.

The present invention relates to a method for providing energy in an airplane. The method comprises the steps of producing wide spectrum white light from a light source. There is the step of transmitting the light from the light source through an eye-safe and fire-safe cable. There is the step of powering an avionics box to which the cable is connected by the light transmitted by the cable.

The present invention transmits power between equipment on board a vehicle without the EMI susceptibility or emissions associated with metal wires. Vehicle means any form of transport, for example, boat, truck, automobile, train, plane, etc.

BRIEF DESCRIPTION OF THE SEVERAL VIEWS OF THE DRAWING

In the accompanying drawings, the preferred embodiment of the invention and preferred methods of practicing the invention are illustrated in which.

DETAILED DESCRIPTION OF THE INVENTION

Figure 17:
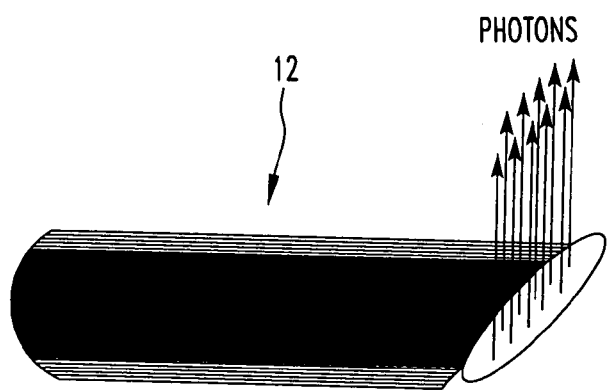
FIG. 17 shows a plastic optical fiber with mirror end point.

Referring now to the drawings wherein like reference numerals refer to similar or identical parts throughout the several views, and more specifically to FIG. 17 thereof, there is shown an apparatus 10 for transmitting wide spectrum white light. The apparatus 10 comprises a plurality of plastic optical fiber 12. The apparatus 10 comprises a sheath 14 housing the plurality of fiber 12.

Preferably, the light source 18 includes a plurality of LEDs 34. The apparatus 10 preferably includes a cover plate 36 adjacent the LEDs 34 to which the optical fiber 12 are connected to receive the light emitted by the LEDs 34. Preferably, the apparatus 10 includes a photon emission surface 38 having waveguides 44 and mirrors 42. The LEDs 34 are disposed on the emission surface 38 in optical communication with the waveguides 44 through the mirrors 42. The apparatus 10 preferably includes a photon receiving surface 40 having waveguides 44 and mirrors 42. The cells are disposed on the receiving surface 40 in optical communication with the waveguides 44 through the mirrors 42.

The present invention relates to an apparatus 10 for providing energy in a vehicle 16. The apparatus 10 comprises means for producing energy that is eye-safe and fire safe. The apparatus 10 comprises a box 22 to which the producing means is connected that is powered by the energy form the producing means.

The producing means is preferably a light source 18 which produces wide spectrum white light, and eye-safe and fire-safe cable 20 through which the light from the light source 18 is transmitted.

Figure 2:
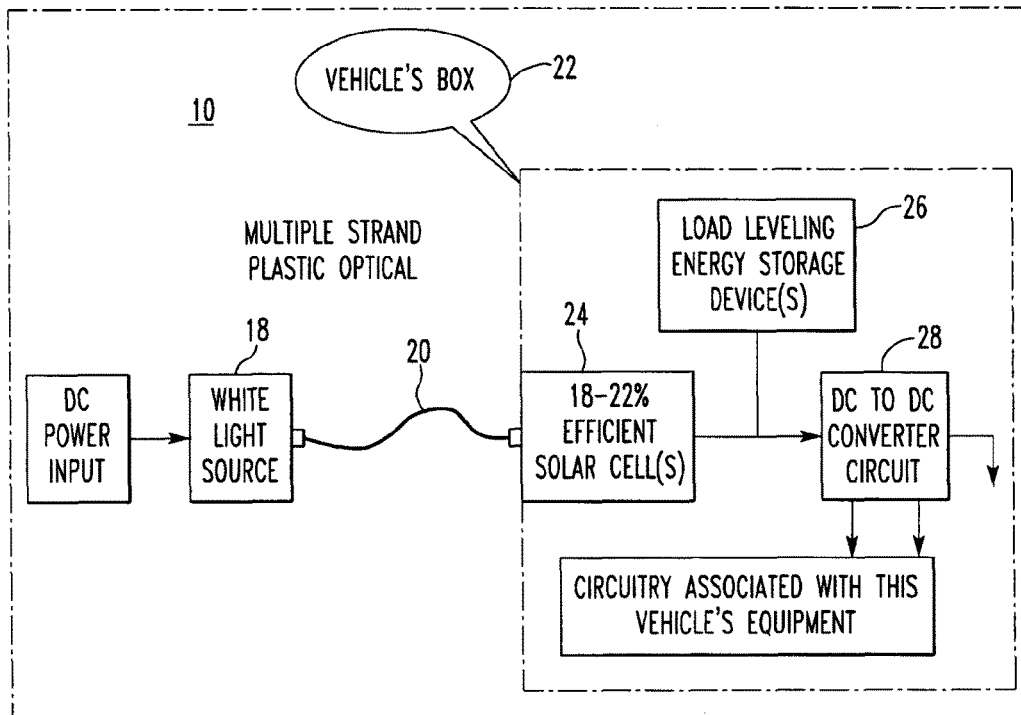
FIG. 2 shows an eye-safe power transmission system of the present invention.

The present invention relates to an apparatus 10 for providing energy in a vehicle 16, as shown in FIG. 2. The apparatus 10 comprises a light source 18 which produces wide spectrum white light. The apparatus 10 comprises an eye-safe and fire-safe cable 20 through which the light from the light source 18 is transmitted. The apparatus 10 comprises a box 22 to which the cable 20 is connected that is powered by the light transmitted by the cable 20.

Preferably, the box 22 includes at least one solar cell 24 in communication with the cable 20 that receives the white light from the cable 20 and converts it into DC. The box 22 preferably includes an energy storage device 26 and electrical communication with the solar cell 24. Preferably, the box 22 includes a DC to DC converter circuit 28. The cable 20 preferably includes a plurality of plastic optical fibers 12. Preferably, the cable 20 includes a sheath 14. Each fiber preferably carries at least 1 watt of white light, although each fiber could carry more than 1 watt. Preferably, the box 22 is a shield for any components inside the box from EMI and also keeps any radiation inside the box from escaping the box.

The present invention relates to a method for providing energy in an airplane 30. The method comprises the steps of producing wide spectrum white light from a light source 18. There is the step of transmitting the light from the light source 18 through an eye-safe and fire-safe cable 20. There is the step of powering an avionics box 32 to which the cable 20 is connected by the light transmitted by the cable 20.

Preferably, the transporting step includes the step of transporting the light through plastic optical fiber 12 of the cable 20. The powering step preferably includes the step of receiving the white light from the fiber 12 at solar cells 24 in the box 22 and producing DC by the cells. Preferably, there is the step of load leveling the DC from the cells.

In regard to the operation of the present invention, the innovations are as follows:

1. Higher continuous power can be transmitted over white light.
2. Power can be transmitted in an eye-safe, and fire-safe manner.
3. Low cost photo-voltaic converters can be used (White-light Solar cells).
4. Low cost Plastic Optical Fiber (POF) components and assembly tools are used for transmission of white light.
5. The total system weight is decreased for fiber vs. copper.
6. High peak power still available at the receiving end if energy storage is employed.

Higher Power can be Transmitted

Figure 1:
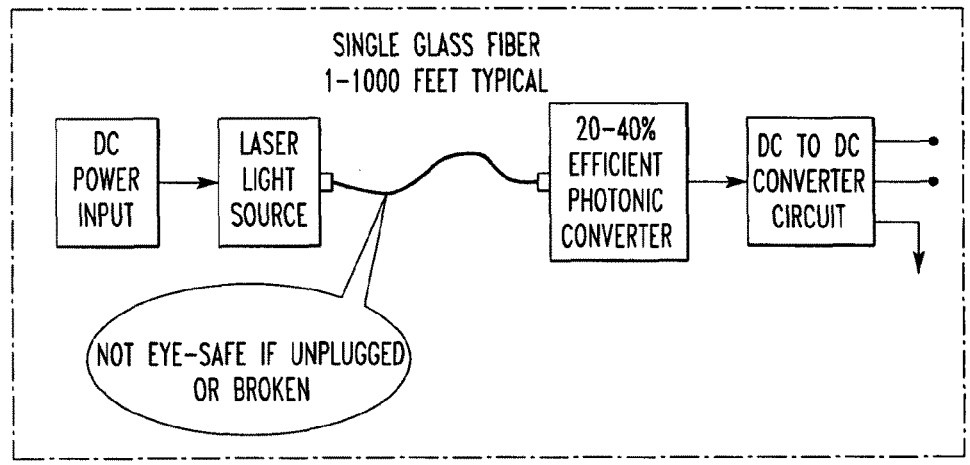
FIG. 1 shows a prior art power transmission system.

As shown in FIG. 2, ten times more power can be transmitted (5 to 10 watts) by using a light source 18 having a wide spectrum of light energy output as compared to a laser source. Current systems use lasers operating at a single wavelength. See FIG. 1. Therefore, all the optical power is concentrated into a tiny band of frequencies. With the new invention, a light source 18 is chosen that has a very wide and flat spectral output power distribution (similar to sunlight). Several light sources are commercially available that have "wide and flat" spectral output power distribution curves such as HID (High Intensity Discharge lamps).

Power can be Transmitted in an Eye-Safe, Fire-Safe Manner

The power contained in wide-spectrum white light is spread over a large range of frequencies. Since total power delivered is a function of the area under the spectral power distribution curve, then the way to transmit more power is to increase the area under the curve. A wide spectrum of moderate intensity can contain much more area then a narrow (spike shaped) spectrum of high intensity. Because of this, no single part of the spectrum carries unsafe levels of light energy. With current laser-based systems, the energy is all concentrated into one frequency, and, therefore, can cause eye injury if the fiber optic cables are broken or unplugged during operation.

Figure 5A:
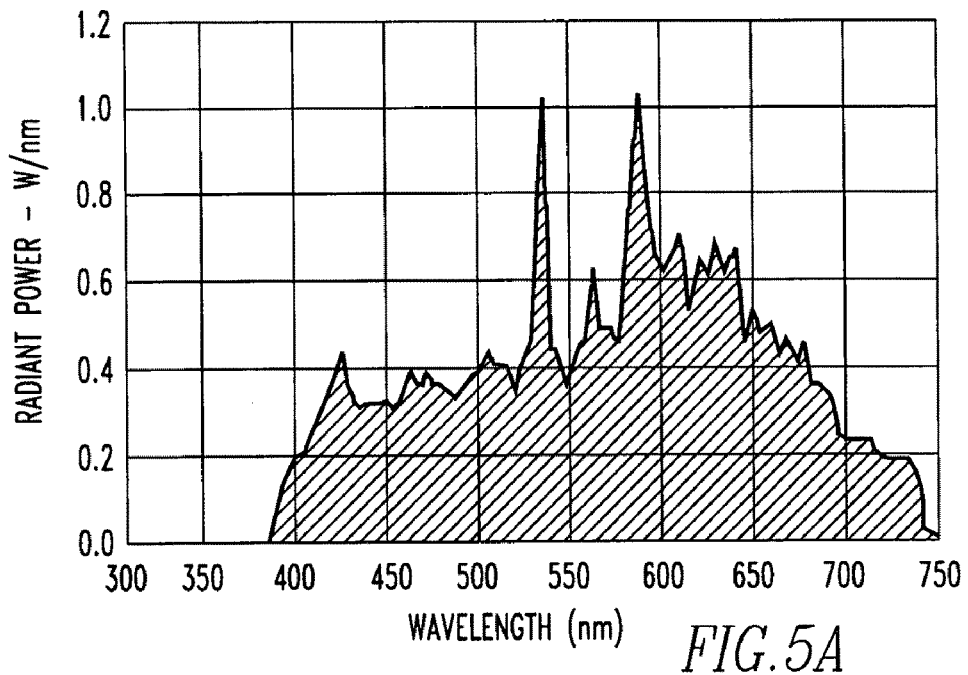
FIGS. 5a and 5b show a wide-spectrum output of a lamp and of outdoor daylight, respectively.
Figure 5B:
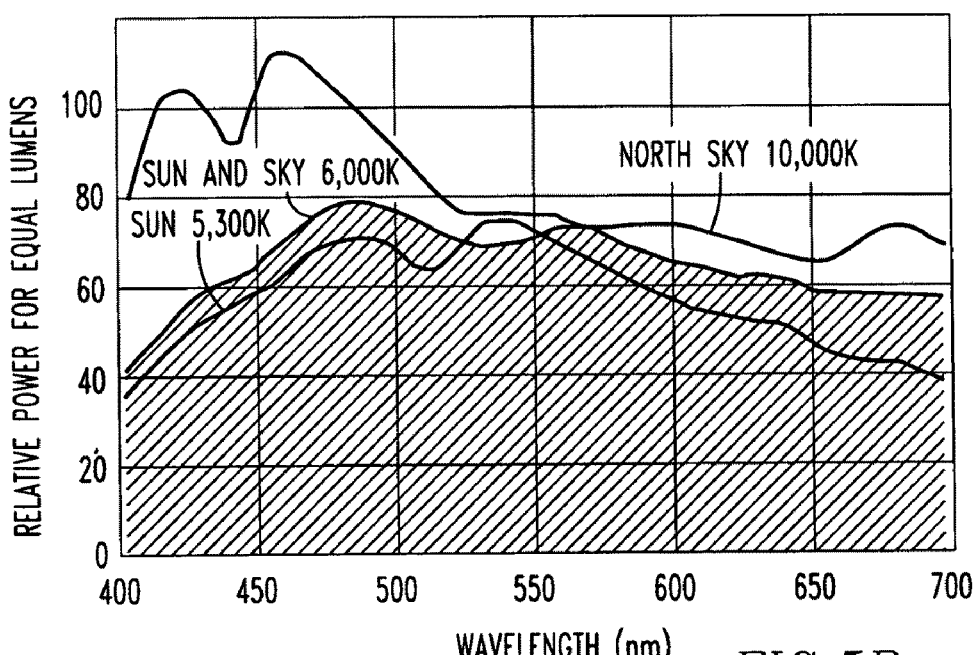

The Spectral Power Distribution Curve (SPD) displays the visual profile of the color characteristics of a light source, as shown in FIG. 5*a* and of outdoor light in FIG. 5*b*. They show the radiant power emitted by the source at each wavelength or band of wavelengths over the visible region (380 to 760 nm).

Fiber Cable Detail

Figure 3:
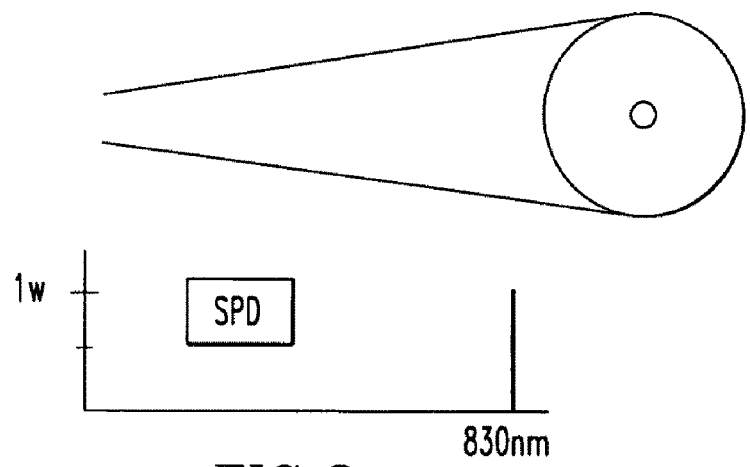
FIG. 3 shows prior art single glass fiber.

In the prior art, as shown in FIG. 3, the single glass fiber is 1 watt 830 nm wavelength and has a 0.0625 mm core diameter. The power intensity looking into fiber tip=333 watts per square mm spread over 825-835 nm wavelength or 33.3 watts/mm2 per nm. It is not eye-safe and could cause fires if cable 20 is broken.

Figure 4:
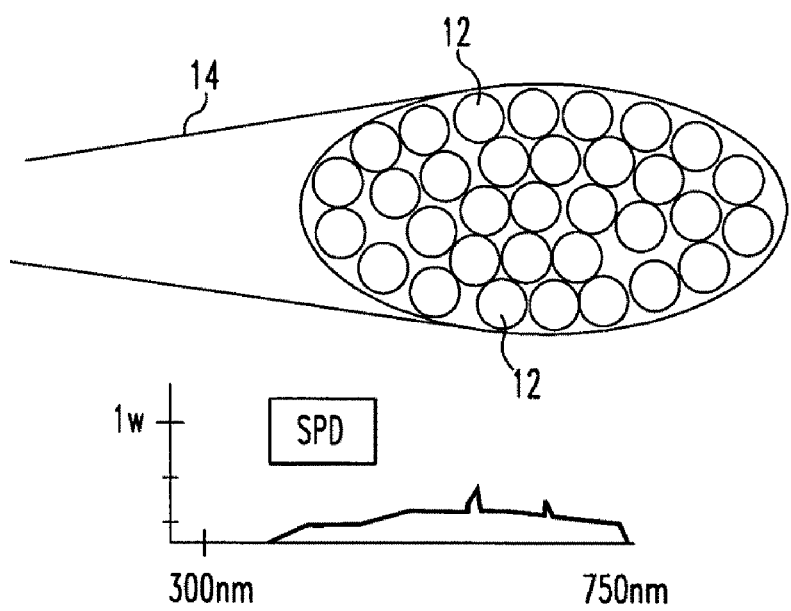
FIG. 4 shows 40 plastic fibers of the present invention.

As shown in FIG. 4, regarding the present invention, there are 40 plastic fiber 12, each carrying 1 watt of white light. Each plastic fiber has 1 mm core diameter. The power intensity looking into fiber tip=1.27 watts per square mm spread over nm wavelength or 0.004 watts/mm2 per nm. It is very eye-safe and will not start a fire.

Certain types of light bulbs can produce a wide-spectrum output, at optical powers of 10-500 watts. These types of light sources are used to illuminate the white light POF fiber. These light sources most closely approximate sunlight.

The total system weight is decreased using optics versus wires due to the following.

1. No circuit breakers are needed for each separate fiber-powered box 22.
2. Plastic fiber is lighter then copper wires. This can save tens or even hundreds of lbs. of weight for larger vehicles.
3. With wave-length division multiplexing, both power and data can be sent over the same plastic fiber 12, thus reducing weight further.
4. POF connectors and cabling do not need to be made of metal, since there is no electromagnetic interference issue to worry about. Metallic Faraday cages surrounding connectors and cabling is not needed.
5. EMI filter components are not required in the circuitry associated inside the device box 22 since no EMI can be conducted or radiated to/from the Plastic Optic Fiber entering the box 22.

High peak power is still available at the receive end if energy storage is used.

The power from the fiber is used to trickle-charge capacitors or batteries. When a large amount of power is needed momentarily, it can be sourced from the storage device (load leveling).

Figure 6:
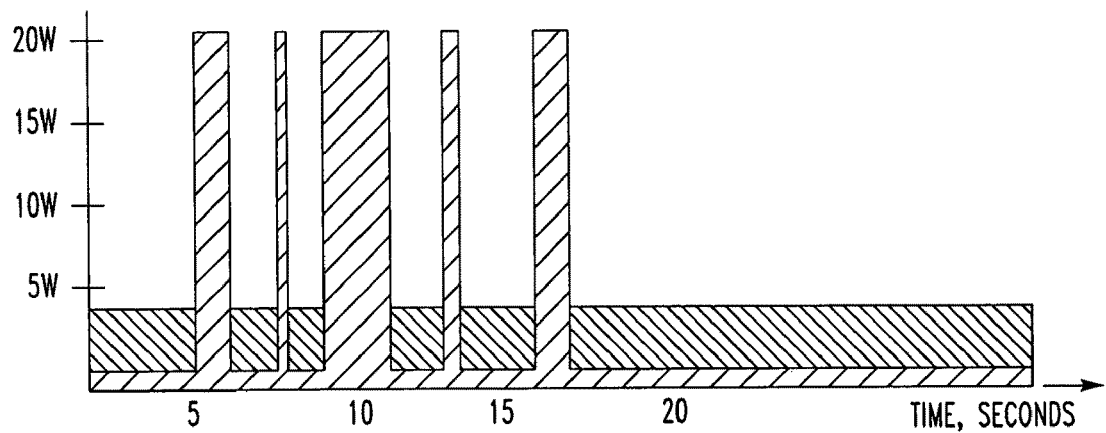
FIG. 6 shows a graph in regard to load leveling of the present invention.

In a load leveling example, as shown in FIG. 6, for an aviation communications radio: needs 20 watts of power for 10 seconds during pilot transmissions, but only 5 watts of power is available via white light fiber; 20 watts for a few seconds or minutes. Supplied from storage device. Average power required from plastic fiber: 4.8 w watts—to keep storage device fully charged.

Additional Example Wide Spectrum color output light bulbs. These bulbs are normally used in projector applications.

Product Number: W-DDM

Specialty Brand, DDM 80 W, 19V Slide Projector Lamp, with GX5.3 Base, 50 Hours Rated Life, (2.00 inch/50.8 mm diameter, 1.75 inch/44.5 mm length), 3250K color, Sold Individually.

Product Number: 261016
Philips 100 W, 12V, GY6.35 Base, Clear Finish, Photo Projection Lamp (length 1.73"), Sold Individually.
Product Number: W-DZE/FDS
Value Brand 150 Watt, 24 Volt, Bi-Pin Base (GY9.5), Microfilm Projector Lamp, Color 3250K, (diameter 0.55", length 2.25"), ANSI Code DZE or FDS, Sold Individually.

Light is focused by reflector(s) to the illuminator's port(s) so that it can be fed into the fiber 12. This light output can be dimmed, depending on the lamp used, and its color can be changed kinetically via use of a color wheel accessory.

Light Sources

Both common light sources and lamps designed specially for fiber-optic lighting can be used with illuminators. Common lamps include low-voltage halogen with built-in dichroic reflectors, higher-wattage quartz halogen lamps and metal halide lamps and xenon metal halide lamps with custom reflectors. Metal halide lamps require a ballast.

Low-voltage halogen lamps are typically used for display and accent lighting and to create starry ceilings. Higher-wattage quartz halogen lamps are typically used to gain higher light output in task, accent, landscape, pool and fountain lighting applications; these lamps are dimmable.

Metal halide lamps, generally 150 or 400 W (up to 1000 W), are typically specified for architectural applications such as detailing, cove and downlighting. They are rapidly assuming a major share of the market. New light sources are being introduced for use in fiber-optic lighting systems.

Xenon metal halide lamps, manufactured by General Electric, are 60 W lamps that produce 2-10 times the brightness of standard metal halide lamps, according to the company. Due to this high brightness, no additional reflectors are needed.

Philips Lighting recently introduced a 150 W ceramic-tube metal halide reflector lamp that delivers high color rendering with concentrated red spectral content and features a firm mounting flange to help with prefocusing the lamp onto the port.

Specialty products utilizing lasers as the light source are also available. High-budget entertainment installations have utilized lasers in "light rope" applications, with the lasers resulting in extraordinarily brilliant and uniform lighting effects and stunningly saturated color effects.

The newest light source to be used in fiber-optic lighting, however, may be LEDs 34, with single LEDs 34 attached to single fiber 12.

Figure 7:
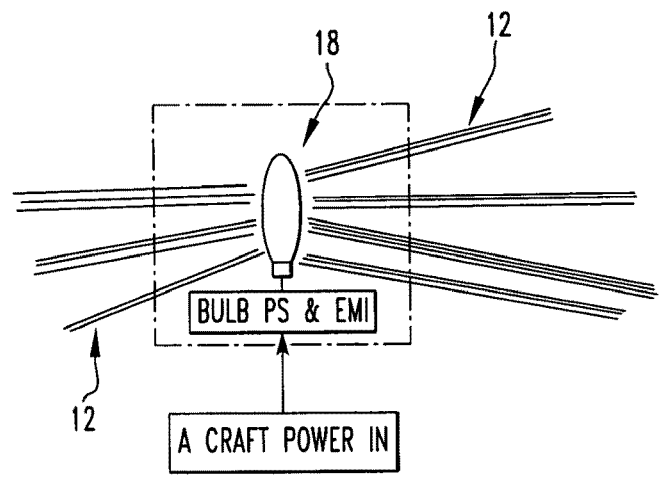
FIG. 7 shows coupling of a light bulb to the plastic fibers.

Example of coupling light bulb to fiber, as shown in FIG. 7—for non-reflector bulbs, the fibers 12 are mounted in a small box 22 that holds the fiber tips all pointing towards the bulb filament. Fiber-bundles carrying white light. Each bundle routes to a single aircraft avionics box 32. Some boxes may have more than one bundle coming into them for increased power or for redundancy. Power by Fiber Illuminator metal box: size 5×5×5 inches or smaller. Mounted near the engine compartment where electrical input power is available.

If using a reflector-style bulb, all the fiber end tips are pointed into the reflector.

Figure 8:
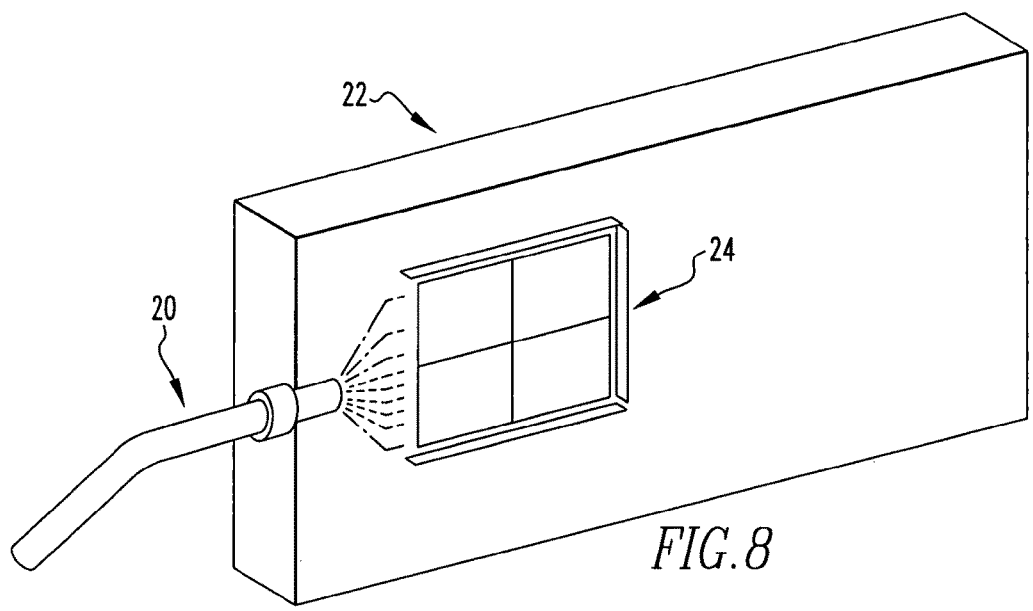
FIG. 8 shows a box to receive the light from the plastic fibers.

In the method of construction to receive the light from the fiber and shine it on solar cells 24, as shown in FIG. 8, any commercially available solar cells may be used—there are many kinds available.

By connecting the solar cells 24 in series or parallel, any combination of voltages and currents my be produced for use by the electrical circuitry inside the box 22. Mirrors 42 are used around the side walls of the solar-cell box 22 to bounce the light around inside until it eventually hits the solar cells 24. The mirrors 42 may be flat, or curved so that they reflect the light in the right directions to illuminate the cells. Fibers 12 are splayed out to evenly illuminate the solar cells 24. Another solar-cell array forms the other top-lid of the thin solar cell 24 box (not shown here) which collects even more light and produces more electricity. The fire-jacketed fiber bundle contains 10 to 500 fibers 12 and held together by a fiber bundle connector.

Figure 9:
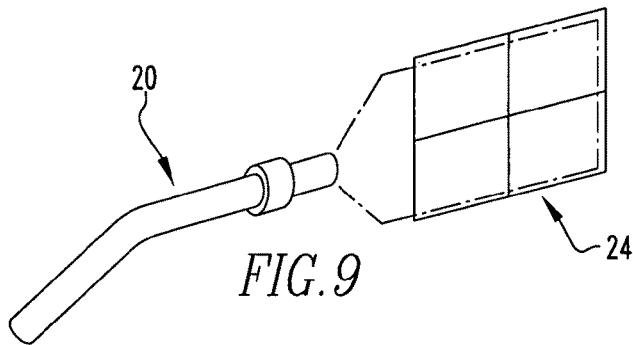
FIG. 9 shows a fiber bundle with a solar cell plate.

Alternate method to direct light from the fiber bundle to shine on the solar cell 24 using a polymer waveguide, as shown in FIG. 9. Polymer waveguides are available from Optical Cross Links, Inc., PA, are used to match the fiber bundle aperture to the solar cell 24 face. The polymer waveguide also accomplishes the 90 degree bending of the light towards the solar-cell face plate so that no side-wall mirrors 42 are necessary with this method.

Figure 10:
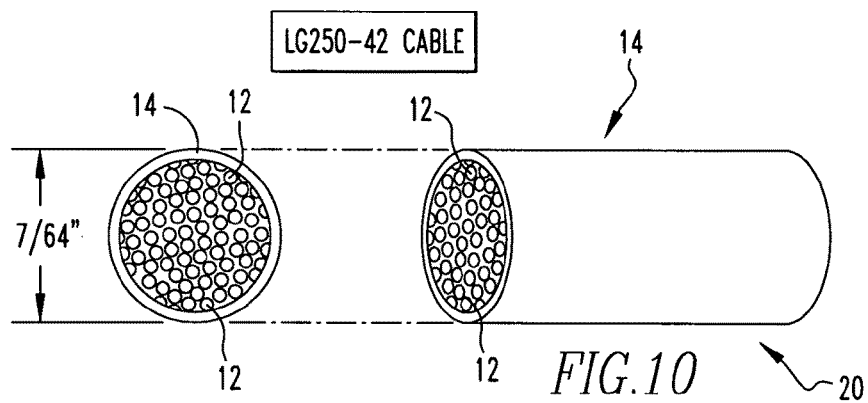
FIG. 10 shows the plastic fibers bundled in a cable.

Example bundled fiber cable 20 sold by Fiber Optic Products Inc., as shown in FIG. 10. For aircraft use, this bundle would have an additional jacket added to it to protect it in harsh environments. The LG250-42 has 42-0.25 mm plastic Fibers in a Black flexible PVC Jacket 3.18 mm. ⅛". This is a new cable and is used for all sorts of hobby model lighting and smaller run lighted projects.

Figure 11:
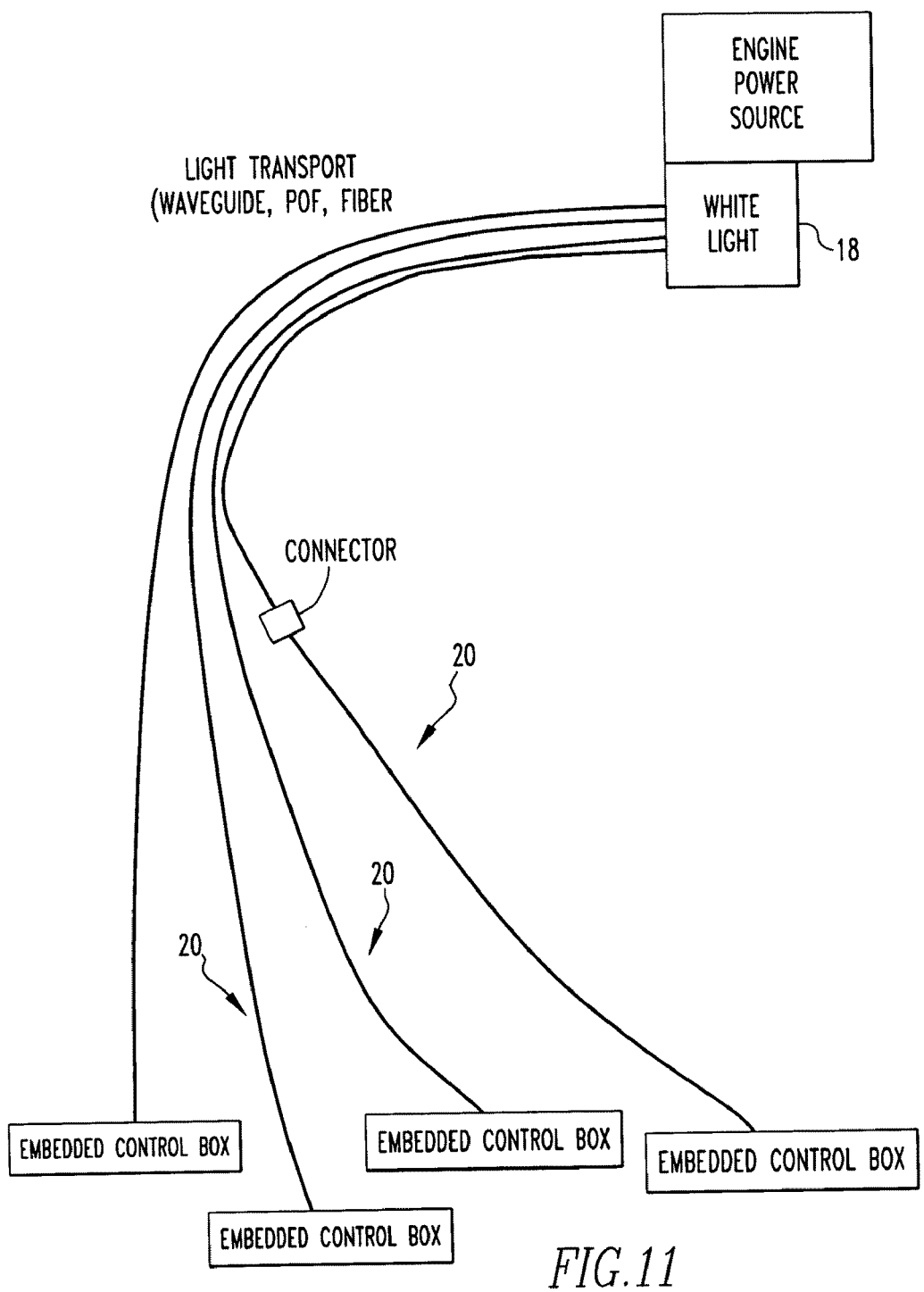
FIG. 11 shows a light transport system of the present invention.

As shown in FIG. 11, this light is produced by LED 34, incandescent, or other means of generating white light. White light being the key to eye-safe and fire-safe transport of optical energy. The IOI power by light eliminates interference by electrical noise, lightning, and EMP while providing clean power without the chance of fire by shorts in the system.

In a preferred embodiment, while a incandescent light bulb was considered, for the light source 18, LEDs 24 are preferred to be used. Luxeon Flash DS49 bare die is used as the source. The source will be in a 10×10 formation as the polymer fiber used is available in a 100 POF in a sleeve. The sleeve is a plastic cover around the 100 POFs and can be clear or opaque. The one purchased off the shelf and used had a clear sleeve around the 100 POFs. The LEDs 34 are mounted to a ceramic substrate in ten rows of ten. The back side of the substrate carries the power and ground connection and will be backed by a heat transfer solution on a heat sink. The emission side of the block of LEDs 34 is a machined plate that allows each of the 1 mm POFs to align to the emission area. See FIG. 12.

Figure 12:
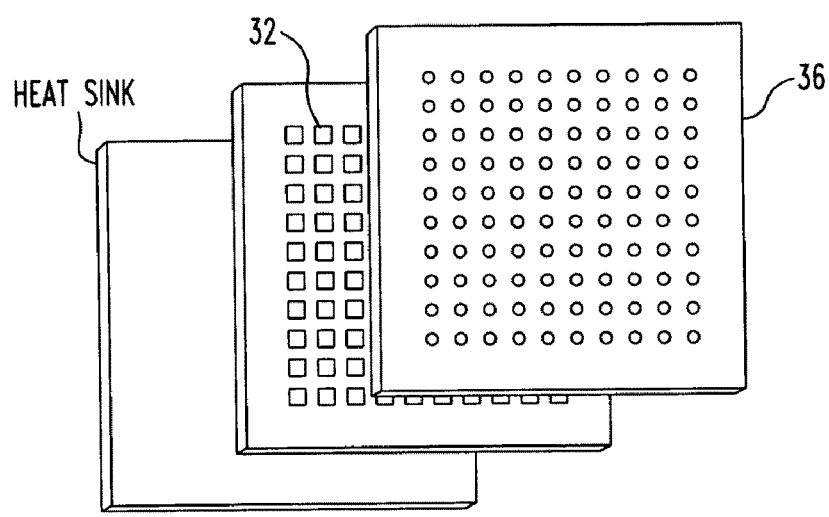
FIG. 12 shows an LED light source.

The cover plate 36 in FIG. 12 will have the 1 mm POFs inserted in each hole. This is demonstrated in FIG. 5. The plastic fibers 12 are inserted in the predrilled holes of the cover plate 36 and the cover plate 36 aligned over the LED 34 in a fashion that transmits the most light. Each of the lens-less LEDs 34 has an optical center of photon emission. It is these optical centers that are aligned exactly 5 mm. 5 mm was chosen to allow a mm on each side for connection area.

Figure 13:
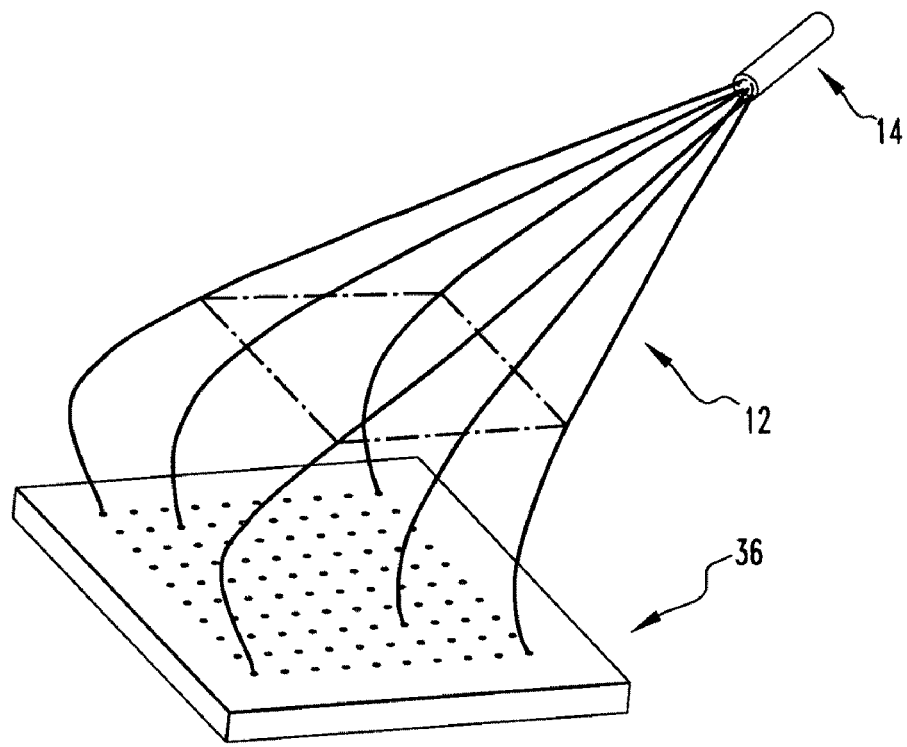
FIG. 13 shows the plastic optical fibers extending from the plate to a sleeve.

The POF now leaves the surface as demonstrated in FIG. 13 and are bunched together by the sleeve for routing to the destination. The POF can be purchased either with the sleeve already installed with 100 POFs with in the sleeve, or the POF can be purchased in bulk and the sleeve added during the build process.

While this technique works, it will be more efficient to move on to the waveguides 44 for this operation.

Figure 14:
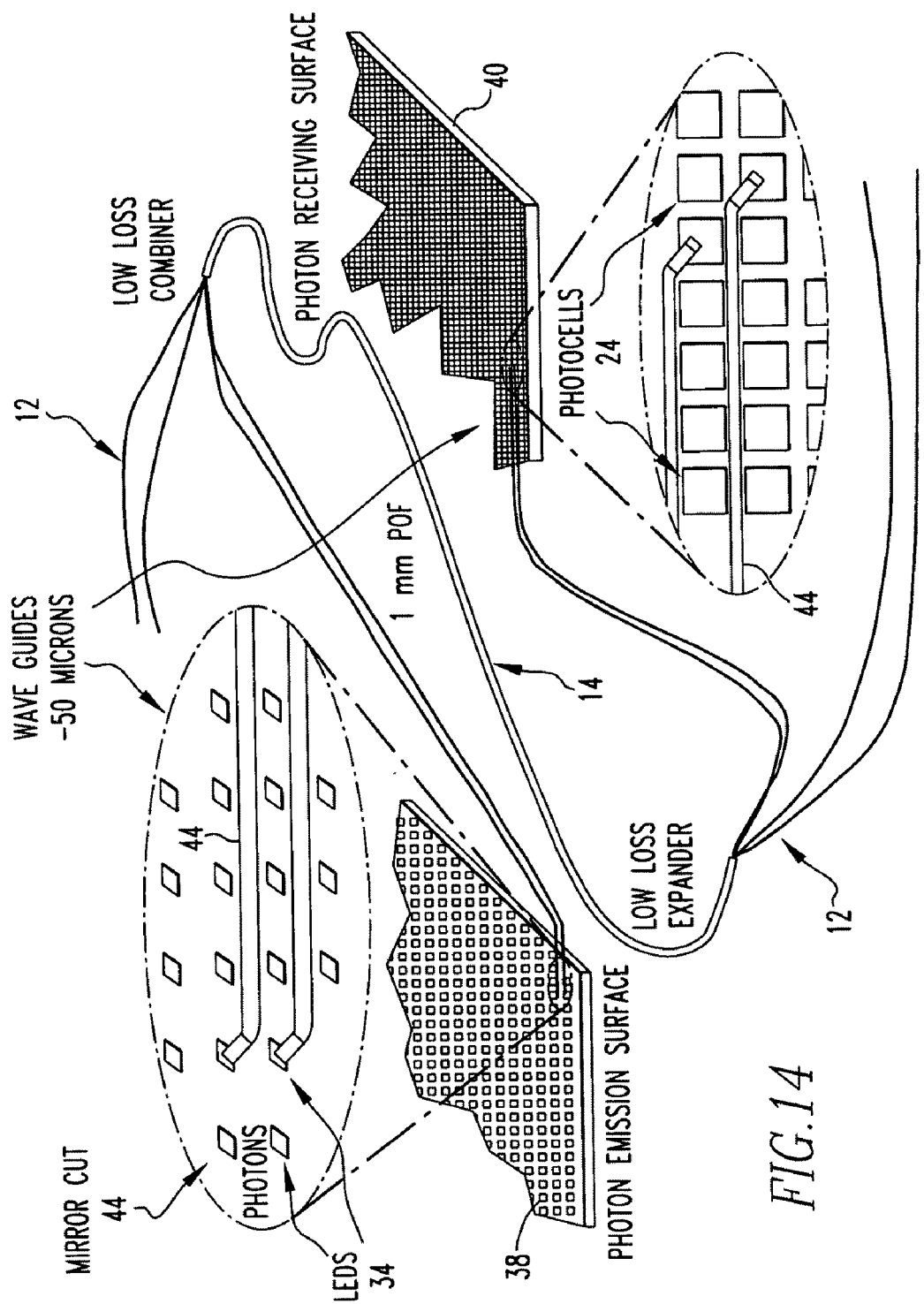
FIG. 14 shows an exploded view of the source of light and the receiving surface of the light.

Using a waveguide that is approximately 45 microns by 45 microns is used to retrieve the photons through a 45 degree mirror cut into the waveguide, as shown in FIG. 14 (and FIG. 17). When the waveguide is placed adjacent to the photon emission source, or less than 15 microns from the emitting surface, a lens is not required. The heat must be extracted from the back side of the photon emitter, LED 34 in this instance, in order to preserve the integrity of the emitter as well as that of the polymer waveguide. The emitters for this unit will be mounted in such a way as to connect directly to the source in an engine compartment. So these emitters will have two LEDs 34 connected in series with a 1 watt 2 ohm resistor to the 12V supply on the engine. The culminated light source 18 will be shipped throughout the vehicle 16 on a 1 mm Plastic Optical Fiber or POF as it is described herein.

The receivers are distributed throughout the vehicle 16 where electronic components need power to operate. Areas, where needed, will have a power storage unit at the receiver site in the form of a Super Cap. If for any reason the power source should be interrupted, the Super Cap(s) will keep power to the unit for some minimal time.

Figure 15:
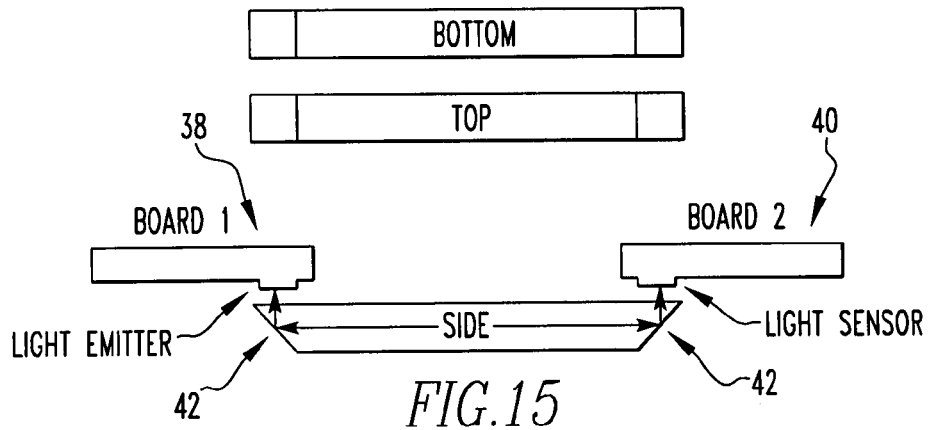
FIG. 15 shows the mirror adoption regarding the light emitter and the light sensor.

The low loss combiner and expanders are a unique way of combining waveguides from their 45 micron by 45 micron into or from a 1 mm plastic optical fiber. At this point, 96 waveguides 44 can be combined into a single 1 mm POF, and likewise, 1 mm POF can be expanded into 96 waveguides 44. This can be used for moving power optically from one point to another, and the power used directly in the form of light, or converted to electrical energy at the receiving. The mirror operation is displayed in FIG. 15. The 45 degree cut on the polymer waveguide creates a mirror. The mirror reflects the incoming light on the left 900 and down the waveguide to the right. When it strikes the 450 mirror on the other end of the waveguide, the energy is reflected 90° to the light sensor on the right.

The receiver end will have two uses. The light itself may be the desired output and therefore will be used for such things as a backlight for a display. In using it as a display backlight, each POF is taken and the surface is roughened to increase the POF loss per foot by diffracting the light outside the POF. This is highly inefficient as seen in FIG. 16, as light is emitted in all directions, not just to the surface.

Figure 16:
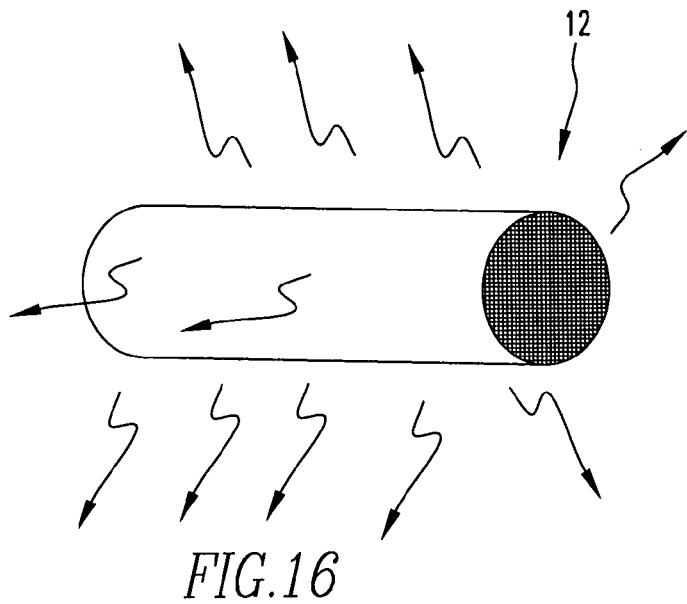
FIG. 16 shows a plastic optical fiber.

In FIG. 17, the light is delivered to the end point in the same fashion as in FIG. 16. However, in FIG. 17, the light is delivered by deflecting up to 99% of the light to the surface where it is needed.

Figure 18:
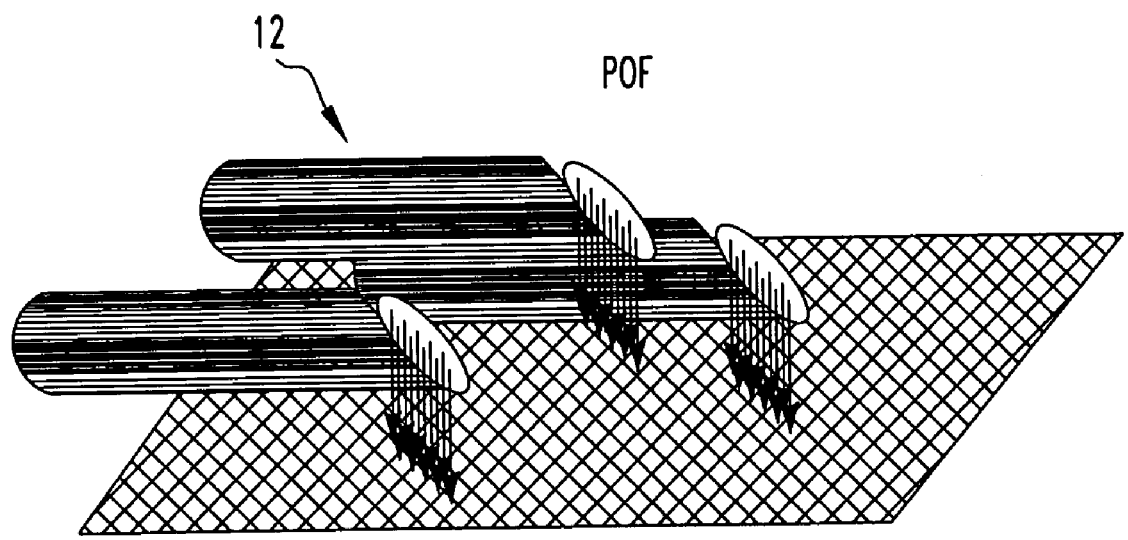
FIG. 18 shows a plurality of fibers and the power receiver.

This leads into the power receiver. Using the same design as in FIG. 17, the majority of the light propagates directly onto the photo cell for power. By using the POF to get the light to the device needing power, it can then be either driven directly from the POF or through a distribution low-loss waveguide fan-out. See FIG. 18.

Figure 19:
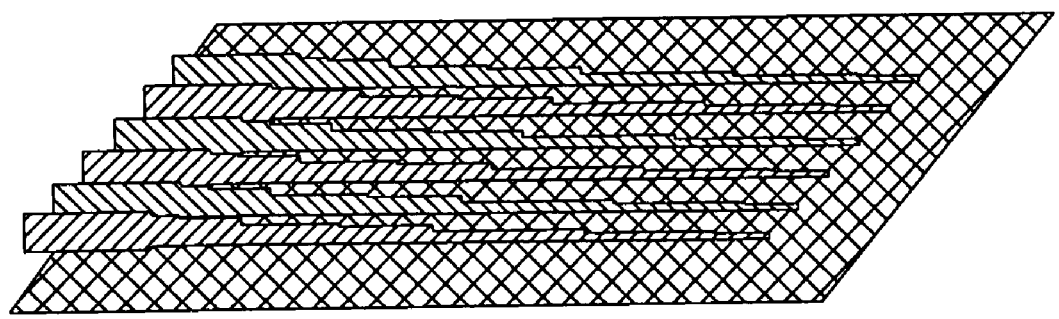
FIG. 19 shows waveguides of the power receiver.

Each 1 mm POF can support 96 waveguides 44, hence, a more even distribution of the light, as shown in FIG. 19. The receiving photo cell produces a fixed voltage and the current varies with the amount of light received. If more voltage is needed than one cell can produce, they can be coupled serially. If more current is needed, they can be coupled in parallel.

Figure 20:
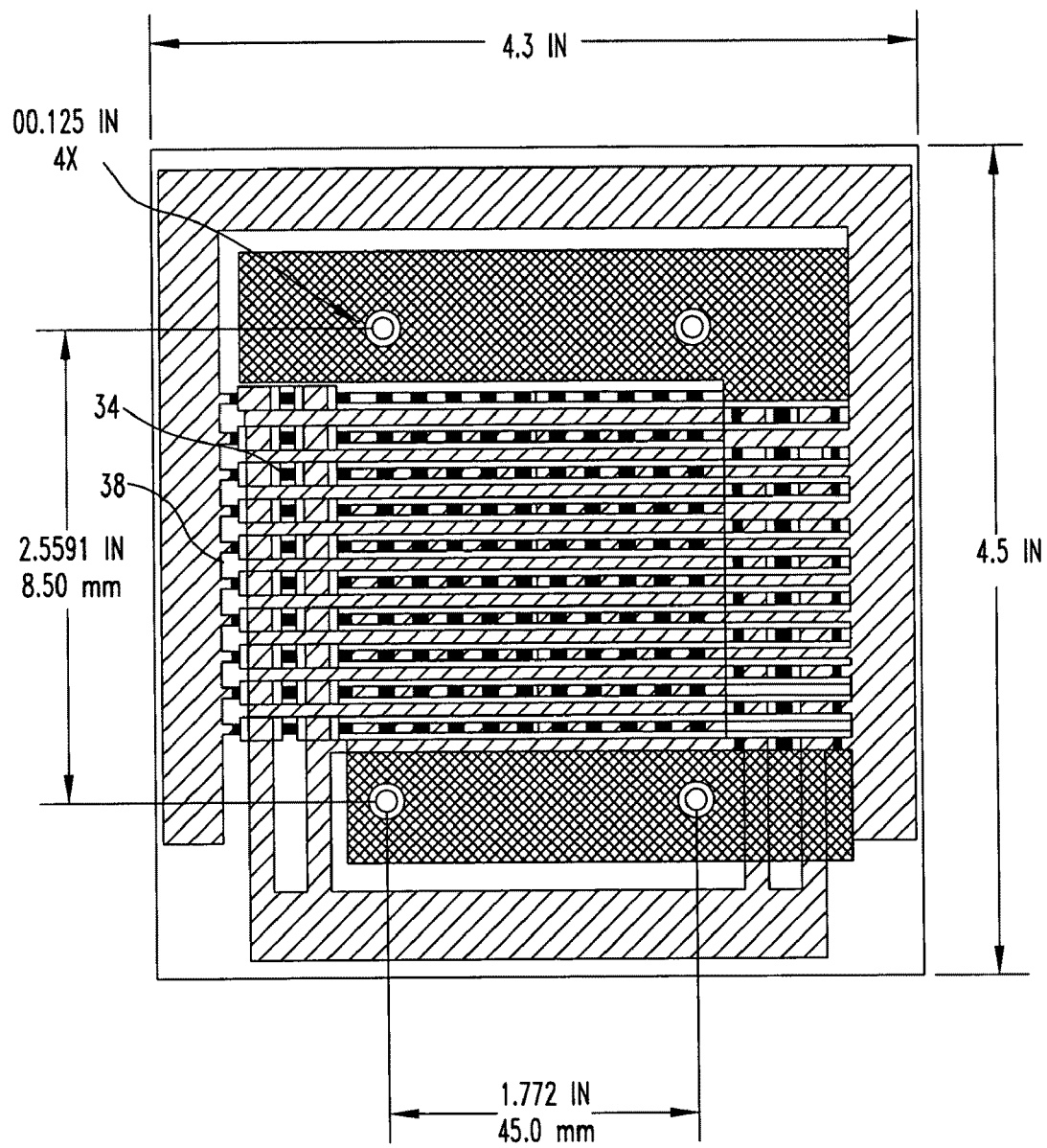
FIG. 20 shows a substrate of the LEDs source.

The substrate is constructed of ceramic and metal layers to allow for mounting the LEDs 34 in the fashion shown in FIG. 20. There is a thermo paste that conducts heat through the backside of the substrate to a finned heat sink to remove the heat generated by the LEDs 34.

Figure 21:
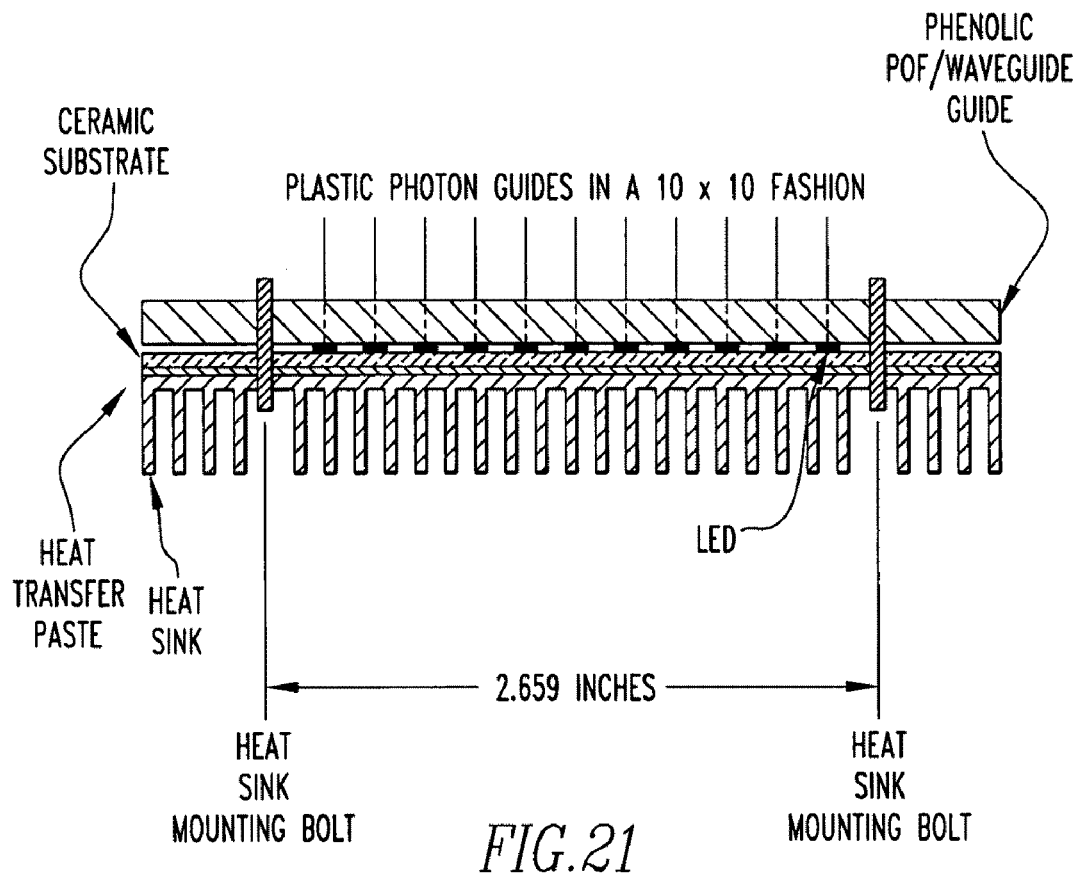
FIG. 21 shows a cross-section of the substrate.

The heat sink is an extruded aluminum heat sink. It can be purchased at places like GRAINGER (#6C911), or Therma-Flo (Power Fin Heatsink). The heat sink is attached to the power side of the ceramic mounting plate with the LEDs 34 attached. This is attached with bolts that go through the 0.125 inch holes in the ceramic substrate from the fiber header to the heatsink. See FIG. 21.

Figure 22:
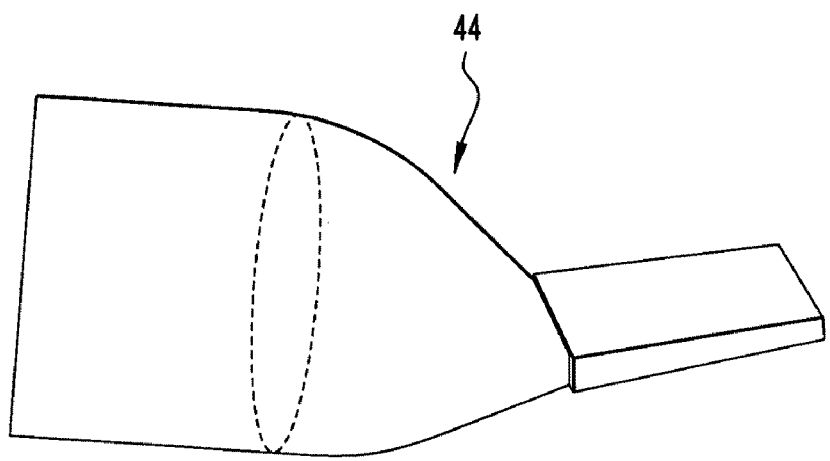
FIG. 22 shows a combiner/extractor.

As shown in FIG. 22, a combiner/extractor will take input from a one inch polymer fiber and guide the photons into a polymer waveguide.

Figure 23:
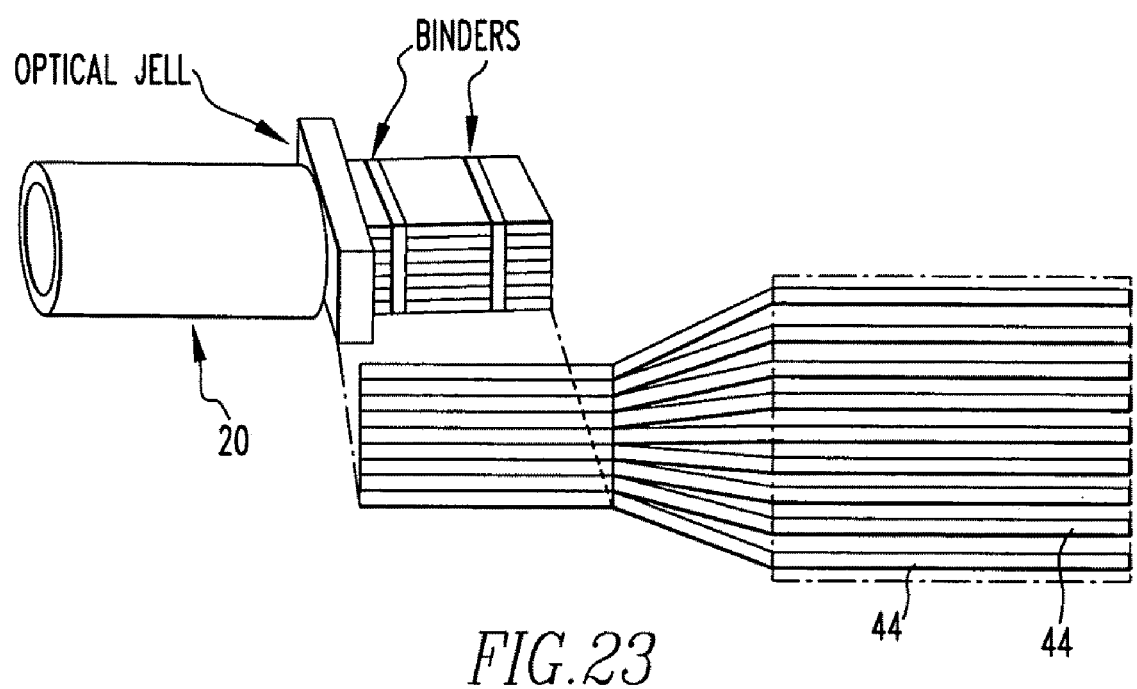
FIG. 23 shows the combining of the individual waveguides.

Referring to FIG. 23, in Step 1: As the individual waveguides 44 come together and are adhered to each other side by side. They can be laid on a very thin plastic sheet if this makes the design easier. In Step 2: they are then layered so as to have 90 to 100 waveguides 44 in a single area. These 10 individual layers of 9 or 10 waveguides 44 are butted with an optical gel to the 1 mm polymer optical fiber as pictured.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. An apparatus for providing energy in a vehicle comprising:
   a light source which produces wide spectrum white light, including eye-safe and fire-safe light;
   a cable through which the eye-safe and fire-safe light from the light source is transported, the cable includes a plurality of plastic optical fibers, each fiber having a tip, the cable includes a sheath disposed about the fibers;
   a coupling box in which the light source is disposed and in which the fiber tips are mounted to receive at least one watt of white light, the light source producing at least enough light so that each fiber receives at least one watt of white light, each fiber carries at least 1 watt of white light; and
   an avionics box to which the cable is connected that is powered by the light transported by the cable, the avionics box includes at least one solar cell in communication with the cable that receives the white light from the cable and converts it into DC.

2. An apparatus as described in claim 1 wherein the avionics box includes an energy storage device in electrical communication with the solar cell.

3. An apparatus as described in claim 2 wherein the avionics box includes a DC to DC converter circuit.

4. An apparatus as described in claim 3 wherein the avionics box provides a shield that does not allow egress or ingress of any EMI component.

5. An apparatus as described in claim 4 wherein the light source includes a plurality of LEDs.

6. An apparatus as described in claim 5 including a cover plate adjacent the LEDs to which the optical fibers are connected, to receive the light emitted by the LEDs.

7. An apparatus as described in claim 6 including a photon emission surface having waveguides and mirrors, the LEDs are disposed on the emission surface in optical communication with the waveguides through the mirrors.

8. An apparatus as described in claim 7 including a photon receiving surface having waveguides and mirrors, the cells are disposed on the receiving surface in optical communication with the waveguides through the mirrors.

9. An apparatus as described in claim 2 wherein the coupling box is a metal box that is 5×5×5 inches or smaller.

10. An apparatus for providing energy in an airplane comprising:
    means for producing energy that is eye-safe and fire safe, the producing means including a metal box that is 5×5×5 inches or smaller, a light source disposed in the box, and a plurality of plastic optical fibers, each fiber carries at least 1 watt of white light, the light source producing at least enough light so that each fiber receives at least one watt of white light, each fiber carries at least 1 watt of white light; and
    an avionics box to which the producing means is connected that is powered by the energy from the producing means.

11. A method for providing energy in an airplane comprising the steps of:

producing wide spectrum eye-safe and fire-safe white light from a light source disposed in a metal box 5×5×5 inches or less in size;

transporting the light from the light source through a cable; and powering an avionics box to which the cable is connected by the light transported by the cable; wherein the transporting step includes the step of transporting at least 1 watt of light through each of a plurality of plastic optical fibers of the cable.

12. A method as described in claim 11 wherein the powering step includes the step of receiving the white light from the fibers at solar cells in the box and producing DC by the cells.

13. A method as described in claim 12 wherein the DC produced by the cells has a load and including the step of load leveling the DC from the cells.

14. A method for providing energy in an airplane comprising the steps of:

producing wide spectrum eye-safe and fire-safe white light from a light source;

transporting the light from the light source through a cable, the cable includes a plurality of plastic optical fibers, the cable includes a sheath disposed about the fibers;

powering an avionics box to which the cable is connected by the light transported by the cable by receiving the white light from the fibers at solar cells in the box and producing DC having a load by the cells; and load leveling the DC from the cells.

* * * * *